United States Patent
Zawaideh et al.

(10) Patent No.: US 9,071,956 B2
(45) Date of Patent: Jun. 30, 2015

(54) SYSTEMS AND METHODS FOR DYNAMIC ENABLEMENT OF WIRELESS COMMUNICATION DEVICE FUNCTIONALITIES

(71) Applicant: QUALCOMM Incorporated, San Diego, CA (US)

(72) Inventors: Fahed I. Zawaideh, San Diego, CA (US); Murali B. Bharadwaj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/692,107

(22) Filed: Dec. 3, 2012

(65) Prior Publication Data

US 2014/0155048 A1 Jun. 5, 2014

(51) Int. Cl.
*H04W 8/22* (2009.01)
*H04W 4/00* (2009.01)

(52) U.S. Cl.
CPC ............... *H04W 8/22* (2013.01); *H04W 4/001* (2013.01)

(58) Field of Classification Search
CPC ........................................................ H04W 8/22
USPC .............. 455/418–420, 434, 411, 435.1, 521, 455/423, 424, 452.2
See application file for complete search history.

(56) References Cited

U.S. PATENT DOCUMENTS

| | | | |
|---|---|---|---|
| 6,421,347 B1 | 7/2002 | Borgstahl et al. | |
| 7,016,306 B2 * | 3/2006 | Alapuranen et al. | 370/238 |
| 7,500,119 B2 | 3/2009 | Tsai | |
| 7,881,748 B2 | 2/2011 | Bari et al. | |
| 8,149,718 B2 * | 4/2012 | Marilly et al. | 370/241 |
| 8,218,478 B2 * | 7/2012 | Lim et al. | 370/328 |
| 8,607,096 B2 * | 12/2013 | Fukuyama et al. | 714/32 |
| 8,626,678 B2 * | 1/2014 | Baltatu et al. | 706/12 |
| 8,675,475 B2 * | 3/2014 | Bisdikian et al. | 370/218 |
| 2002/0037715 A1 * | 3/2002 | Mauney et al. | 455/421 |
| 2005/0037755 A1 | 2/2005 | Hind et al. | |
| 2005/0193150 A1 | 9/2005 | Buckley et al. | |
| 2006/0161680 A1 * | 7/2006 | Balsevich | 709/245 |
| 2008/0220772 A1 | 9/2008 | Islam et al. | |
| 2009/0061863 A1 * | 3/2009 | Huggett et al. | 455/434 |
| 2010/0161600 A1 * | 6/2010 | Higgins et al. | 707/736 |
| 2010/0183025 A1 | 7/2010 | Stephens et al. | |
| 2010/0291947 A1 | 11/2010 | Annamalai | |
| 2011/0134798 A1 * | 6/2011 | Magnuson et al. | 370/254 |
| 2011/0302509 A1 * | 12/2011 | Leacock et al. | 715/756 |
| 2012/0082098 A1 | 4/2012 | Oprescu-Surcobe et al. | |
| 2012/0210001 A1 * | 8/2012 | Ryerson et al. | 709/225 |
| 2012/0246294 A1 * | 9/2012 | Eaton et al. | 709/224 |
| 2014/0057644 A1 * | 2/2014 | Chetlur et al. | 455/452.2 |

OTHER PUBLICATIONS

International Search Report and Written Opinion—PCT/US2013/071736—ISA/EPO—Mar. 27, 2014.
Taiwan Search Report—TW102143900—TIPO—Mar. 9, 2015.

* cited by examiner

*Primary Examiner* — Cong Tran
(74) *Attorney, Agent, or Firm* — Austin Rapp & Hardman

(57) ABSTRACT

An apparatus operable in a communication system is described. The apparatus includes means for determining a set of wireless communication device functionalities. The apparatus determines the set of wireless communication device functionalities using a functionality table based on a network identifier. The apparatus also includes means for enabling the set of wireless communication device functionalities.

50 Claims, 10 Drawing Sheets

Functionality Table 706

| | |
|---|---|
| Network Identifier A 708a | Wireless Communication Device Functionality A 710a |
| | Wireless Communication Device Functionality B 710b |
| | Wireless Communication Device Functionality C 710c |
| Network Identifier B 708b | Wireless Communication Device Functionality B 710b |
| | Wireless Communication Device Functionality C 710c |
| Network Identifier C 708c | Wireless Communication Device Functionality A 710a |
| | Wireless Communication Device Functionality D 710d |

FIG. 7

| Functionality Table 806 | |
|---|---|
| Wireless Communication Device Functionality A 810a | Network Identifier A 808a |
| | Network Identifier B 808b |
| | Network Identifier C 808c |
| Wireless Communication Device Functionality B 810b | Network Identifier B 808b |
| | Network Identifier C 808c |
| Wireless Communication Device Functionality C 810c | Network Identifier A 808a |
| | Network Identifier D 808d |

SYSTEMS AND METHODS FOR DYNAMIC ENABLEMENT OF WIRELESS COMMUNICATION DEVICE FUNCTIONALITIES

TECHNICAL FIELD

The present disclosure relates generally to electronic communications. More specifically, the present disclosure relates to systems and methods for dynamic enablement of wireless communication device functionalities.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Some electronic devices (e.g., cellular phones, smartphones, computers, etc.) communicate with other electronic devices via a network. For example, a wireless communication device (e.g., cellular phone, smartphone, etc.) may wirelessly communicate with another wireless communication device via a wireless network. This may enable the wireless communication device to access and/or communicate voice, video, data and so on.

At different times, a wireless communication device may be in different networks. In these cases, one or more services may not be supported by the different networks. For example, carriers may have established a set of protocol customizations different than standards that would be specific to that particular network. This may cause a loss of wireless communication quality, or complete loss of wireless communication as a wireless communication device passes from one network to another network. As can be seen from this discussion, systems and methods that improve coordination between a wireless communication device and one or more networks may be beneficial.

BRIEF DESCRIPTION OF THE DRAWINGS

FIG. 7 is a diagram illustrating one example of a functionality table that may be used to establish wireless communication device functionalities;

FIG. 8 is a diagram illustrating another example of a functionality table in which systems and methods for dynamic enablement of wireless communication device functionalities may be implemented;

DETAILED DESCRIPTION

Figure 1:
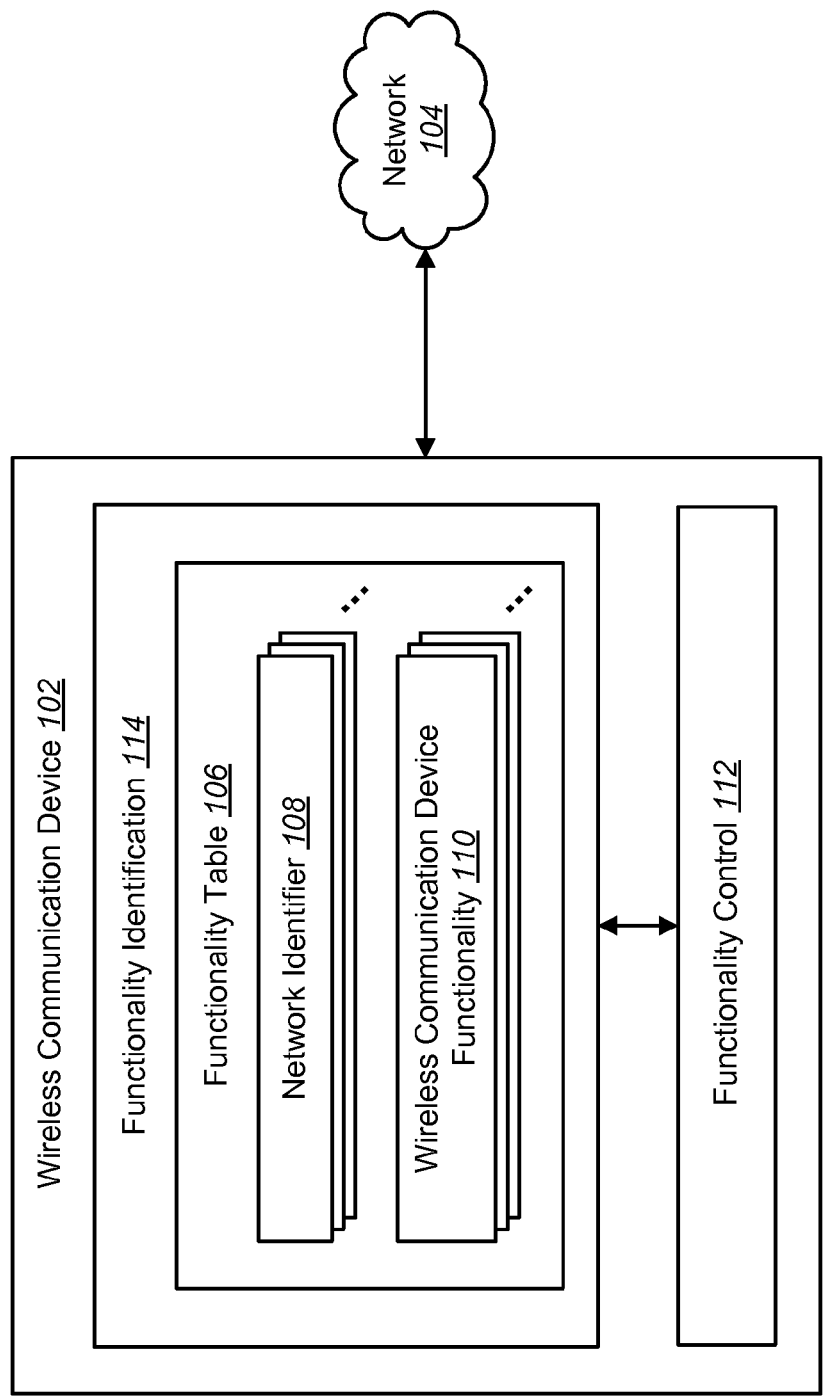
FIG. 1 is a block diagram illustrating one configuration of a wireless communication device and a network in which systems and methods for dynamic enablement of wireless communication device functionalities may be implemented.

The systems and methods disclosed herein describe a wireless communication device for dynamic enablement of wireless communication device functionalities. The wireless communication device uses a network identifier to determine a set of wireless communication device functionalities associated with the network. The wireless communication device then enables the wireless communication device functionalities associated with the network on the wireless communication device. The wireless communication device may also disable those functionalities that are not associated with the network. Examples of wireless communication device functionalities include file sharing, video sharing, voice over internet protocol (VoIP), session initiation protocol (SIP) quality of service (QoS) preconditions, etc. Dynamic enablement of wireless communication device functionalities in this way may improve communication performance in the system.

In the following description, for reasons of conciseness and clarity, terminology associated with the Long Term Evolution (LTE) standards, as promulgated under the 3rd Generation Partnership Project (3GPP) by the International Telecommunication Union (ITU), is used. It should be noted that the systems and methods disclosed herein are also applicable to other technologies, such as technologies and the associated standards related to Code Division Multiple Access (CDMA), Time Division Multiple Access (TDMA), Frequency Division Multiple Access (FDMA), Orthogonal Frequency Division Multiple Access (OFDMA) and so forth. Terminologies associated with different technologies can vary. For example, depending on the technology considered, a wireless communication device can sometimes be called a user equipment (UE), a mobile station, a mobile terminal, a subscriber unit, an access terminal, etc., to name just a few. Likewise, a base station can sometimes be called an access point, a Node B, an evolved Node B (eNB) and so forth. It should be noted that different terminologies apply to different technologies when applicable.

In today's Long Term Evolution (LTE) networks, each carrier is coming up with a set of use case customizations for their Internet Protocol (IP) Multimedia Subsystem (IMS) capable wireless communication devices. These use case customizations may cause different behavior following a network failure. In some configurations, these use case customizations may not be standard, and may be carrier specific. For example, a use case customization may cause a wireless communication device to detach from a Long Term Evolution (LTE) network upon IP multimedia subsystem registration failure. In other words, the wireless communication device may not get Long Term Evolution (LTE) service, or may not get Long Term Evolution (LTE) service on a particular public land mobile network (PLMN). In this example, the wireless communication device may continue to cycle through public land mobile networks. Additional examples of customizations may include specific headers that are added by a carrier and the use of specific headers from a specification that are not used by other carriers that are requested by the carrier. A carrier may refer to an operator.

In case of a packet data network (PDN) disconnect, or if the packet data network rejects some carriers, those carriers may have use case customizations that prevent the wireless communication device from using Long Term Evolution (LTE) service, or at least prevent Long Term Evolution (LTE) service on the public land mobile network on which the failure has occurred. The carrier may also instruct the wireless communication device to cycle through a set of public land mobile networks and perform attachment procedures on different public land mobile networks.

In some cases, a carrier may indicate a number of retries of IP multimedia subsystem registration on a Long Term Evolution (LTE) network before detaching. The carrier may also instruct the wireless communication device how to handle proxy call session control function (P-CSCF) address lists and the updates to it.

With the deployment of Voice over Long Term Evolution (VoLTE), carriers may not be converging to a set of IP multimedia subsystem protocols in their voice over Long Term Evolution (LTE) capable devices. This may cause services to be denied when roaming. One example is the use of quality of service preconditions. In this example, some carriers are deploying session initiation protocol quality of service preconditions while others are not.

An example of differing uses of session initiation protocol quality of service preconditions is given as follows. A device of carrier A may be session initiation protocol quality of service precondition capable for voice over Long Term Evolution (LTE). If device A roams into a network of carrier B that does not deploy session initiation protocol quality of service preconditions or does not understand session initiation protocol quality of service preconditions, then device A may not be able to set up a voice over Long Term Evolution (LTE) call since the network will not understand session initiation protocol quality of service preconditions. Furthermore, its call may be terminated by carrier B and the quality of service preconditions may not be setup.

Take the example of a wireless communication device of carrier C that has a set of use case customizations to detach and avoid Long Term Evolution (LTE) connection for any IP multimedia subsystem failure. If this wireless communication device of carrier C roams into a network of carrier D and the wireless communication device does not support the other air interface network deployed by carrier D, then this roaming device may be without service in a roaming network (e.g., of carrier D) or may be forced to lower its data rate grade, which may impact user experience.

In another example while roaming, certain roaming networks may not desire visitor wireless communication devices (e.g., from another network) to enable services that may be high bandwidth because that may cause service disruption in their network (e.g., the roaming network). A wireless communication device may also roam into a network and due to network constraints, IP multimedia subsystem registration to this wireless communication device may not be granted. This may cause IP multimedia subsystem registration failures that may cause detachment from a Long Term Evolution (LTE) network and may block that Long Term Evolution (LTE) network.

Systems and methods for dynamic enablement of wireless communication device functionalities are described. A wireless communication device may be configured to detect a network that is in communication with the wireless communication device. The wireless communication device may then use a table to look up wireless communication device functionalities of the detected network based on a network identifier. Finally, the device may enable or disable specific functionalities based on the detected network. Different configurations and examples of the systems and methods are given as follows.

A wireless communication device IP multimedia subsystem stack may implement a technique to disable IP multimedia subsystem customizations and may enable a set of failsafe features that may allow the wireless communication device to operate with the least amount of disruption of service upon detecting that the wireless communication device is no longer in home network.

In some examples, the wireless communication device implements a services and customization list (SCL) in an enhanced file system (EFS). The services and customization list may list customizations and services allowed in home networks and customizations and services allowed in roaming networks. Customizations may include determining whether the wireless communication device should detach and block a Long Term Evolution (LTE) public land mobile network based on any IP multimedia subsystem registration failures or not. Services may include rich communication services (RCS-e). The rich communication services may include instant messaging, video sharing and file sharing.

The wireless communication device, upon camping and attaching to a public land mobile network, may determine from a roaming list of public land mobile networks stored in its Subscriber Identity Module (SIM) card whether the public land mobile network is a home network or a roaming network. If the network is a home network, then the wireless communication device may enable the customizations and services according to the services and customization list. If the network is a roaming (e.g., visitor) network, then the wireless communication device may enable the customizations and services in the service and customization list that are mapped to the roaming network. The wireless communication device may enable certain customizations and services based on a roaming network as configured in the services and customization list. In some cases, a home network may configure the customizations and services that are mapped to a roaming network based on a roaming agreement. The service and customization list may be updated over the air. For example, the service and customization list may be updated via an open mobile alliance (OMA) device management (DM) update procedure.

An example of dynamic enablement of wireless communication device functionalities is given as follows. When a wireless communication device powers up, it may read a roaming list from the Subscriber Identity Module (SIM) card that may include a list of home and roaming networks. When the wireless communication device camps on a public land mobile network, it determines whether the public land mobile network is a home network or a roaming network. The wireless communication device may read the service and customization list from the enhanced file system. The wireless communication device may check the service and customization list for services and customizations allowed in a home network vs. those allowed in a roaming network. The wireless communication device may further check whether this particular public land mobile network is listed in the services and customization list. The wireless communication device may then enable customizations or services allowed and disable customizations or services that are not allowed.

As described above, examples of customizations include session initiation protocol quality of service preconditions, detaching from a Long Term Evolution (LTE) public land mobile network and blocking that public land mobile network upon IP multimedia subsystem registration failures, detaching from a Long Term Evolution (LTE) public land mobile network and blocking the Long Term Evolution (LTE) public land mobile network if a packet data network disconnect occurs and attempting IP multimedia subsystem registration multiple times before providing service to a wireless communication device. Similarly, as described above, examples of service include video telephony, video share and file share.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed but is merely representative of the systems and methods.

FIG. 1 is a block diagram illustrating one configuration of a wireless communication device 102 and a network 104 in which systems and methods for dynamic enablement of wireless communication device functionalities 110 may be implemented. The wireless communication device 102 may also be referred to as, and may include some or all of the functionality of, a terminal, an access terminal, a subscriber unit, a station, a user equipment, etc. Examples of wireless communication devices 102 may include a cellular phone, a personal digital assistant (PDA), a wireless device, a wireless modem, a handheld device, a laptop computer, a session initiation protocol phone, a wireless local loop (WLL) station, etc.

The wireless communication device 102 may include a functionality identification block/module 114 and/or a functionality control block/module 112. As used herein, the phrase "block/module" indicates that a particular component may be implemented in hardware, software or a combination of both. For example, the functionality control block/module 112 may be implemented with hardware components such as circuitry and/or software components such as instructions or code, etc.

It should be noted that the term "apparatus" may be used herein to refer to a base station, an electronic device, a wireless communication device and/or other device. It should also be noted that a "communication system" may include one or more of a base station, an electronic device, a wireless communication device and other device(s).

The wireless communication device 102 may communicate with a network 104. In some configurations, the wireless communication device 102 may communicate with one or more types of networks 104. Examples of the network 104 include a home network 104 and a roaming network 104. As used herein, the term "home network" may refer to a network 104 where the communication service was registered. In some configurations, a home network may be associated with a particular service provider or carrier. As used herein, the term "roaming network" may refer to a network 104 that is not a home network 104.

The network 104 may communicate with the wireless communication device 102 based on a technology. Examples of network 104 technologies include Long Term Evolution (LTE), High Speed Packet Access (HSPA), Evolved High Speed Packet Access (HSPA+), Universal Mobile Telecommunications System (UMTS), High Rate Packet Data (HRPD), Enhanced High Rate Packet Data (eHRPD), Institute of Electrical and Electronics Engineers (IEEE) 802.11 (Wi-Fi), Interworking-Wireless Local Area Network (iW-LAN) and Worldwide Interoperability for Microwave Access (WiMAX).

The functionality identification block/module 114 may determine a set of wireless communication device functionalities 110. As will be described in greater detail below, a wireless communication device functionality 110 may indicate how a wireless communication device 102 may communicate with a network 104 that is in communication with the wireless communication device 102. For example, a wireless communication device functionality 110 may include wireless communication device behaviors, customizations, services, features, functions, applications and/or specific customizations per a network carrier (e.g., a network carrier that corresponds to the network identifier) that indicate how a wireless communication device 102 may behave in communicating with the network 104 that is in communication with the wireless communication device. As will be explained in detail below, in some configurations, the wireless communication device functionalities 110 may be mapped to a network 104, for example via a network identifier 108. More specific examples of functionalities include session initiation protocol (SIP), quality of service (QoS) preconditions, detaching from a Long Term Evolution (LTE) network public land mobile network and blocking that public land mobile network upon Internet Protocol (IP) Multimedia Subsystem (IMS) registration failures, detaching from a Long Term Evolution (LTE) network public land mobile network and blocking the Long Term Evolution (LTE) public land mobile network if a packet data network (PDN) disconnect occurs, attempting Internet Protocol (IP) Multimedia Subsystem (IMS) registrations multiple times before providing service, video telephony, video sharing and file sharing. In some implementations, a wireless communication device functionality 110 may be an internet protocol multimedia subsystem functionality 110.

In some configurations, a wireless communication device functionality 110 may be distinct from a wireless communication device 102 capability. For example, wireless communication device 102 capabilities may be used to establish a connection with the network 104. In other words, in some configurations, a wireless communication device 110 may not include wireless communication device 102 capabilities. For example, a wireless communication device 102 may perform capability negotiation to determine whether the wireless communication device 102 capabilities may allow communication with the network 104. Accordingly, in some configurations, capability negotiation may occur before determining the set of wireless communication device functionalities 110. Examples of wireless communication device 102 capabilities may include whether the wireless communication device 102 uses a Long Term Evolution (LTE) protocol, a Universal Mobile Telecommunications System (UMTS) release 99 protocol or a 1x Evolution-Data Optimized protocol for establishing a session with the network 104. After communication has been enabled (e.g., when the wireless communication device 102 has camped on or attached to a network 104), the wireless communication device 102 may establish a set of wireless communication device functionalities 110 that dictate how the wireless communication device 102 may behave in communicating with the network 104.

In some configurations, the wireless communication device 102 capabilities may be standardized for one or more network 104 carriers. By comparison, one or more of the wireless communication device functionalities 110 may not be standardized for one or more network 104 carriers in some configurations. For example, a wireless communication device 102 capability may include authentication methods that are used by one network 104 carrier and not by another network carrier (e.g., IP multimedia subsystem authentication and key agreement (IMS-AKA), hypertext transfer protocol (HTTP) digest, generic authentication architecture (GAA), general packet radio service-IP multimedia subsystem-bundled authentication (GIBA)). In some cases, one or more of the capabilities may be standardized, pre-defined and/or based on carrier requirements. Other examples of wireless communication device 102 capabilities may include the security method used by one network 104 carrier (e.g., transport layer security (TLS), internet provider security (IPS), Internet Key Exchange (IKEv2)). A wireless communication device 102 capability may also include the capability discovery procedures used by one network carrier as part of rich communication suite (RCS) framework. Capabilities may also include the specific headers defined by a specification but that network 104 carriers tend to overload and what values the headers are populated with. In some configurations, a wireless communication device functionality 110 may include a capability. For instance, some configurations of the systems and methods disclosed herein may be utilized to select one or more capabilities to use based on a services and customizations list table and/or a public land mobile network. As described above, in other configurations, a wireless communication device functionality 110 may not include a capability. In this example, the wireless communication device 102 may select which wireless communication device functionality 110 based on the functionality table 106 and a network identifier.

In some examples, the wireless communication device 102 may know the wireless communication device 102 capabilities. For example, the wireless communication device 102 capabilities may be recognized independent of a communication with another electronic device (e.g., no exchange of messages about capability information). In other words, the wireless communication device 102 capabilities may be known by the wireless communication device 102 independent of a capability discovery with another electronic device.

In some configurations, the functionalities 110 may be predetermined. For example, the functionalities 110 may be predetermined and stored on the wireless communication device 102. Accordingly, the wireless communication device 102 may not transmit or receive any messaging in order to determine the functionalities 110 in some configurations. For example, the wireless communication device 102 may not signal a request for functionalities 110 to the network 104 and the wireless communication device 102 may not receive functionalities 110 from the network.

The functionality identification block/module 114 may determine the set of wireless communication device functionalities 110 based on the network 104. More specifically, the functionality identification block/module 114 may determine the set of wireless communication device functionalities 110 based on a network identifier 108 of a network 104 in communication with the wireless communication device 102. For example, the functionality identification block/module 114 may determine the set of wireless communication device functionalities 110 that are mapped to the network 104 as identified by the network identifier 108. Each set of wireless communication device functionalities 110 mapped to a network identifier 108 may define a mode of operation of the wireless communication device 102. In some configurations, the functionality identification block/module 114 may determine the wireless communication device functionalities 110 based on the type of network 104. For example, the functionality identification block/module 114 may determine one set of wireless communication device functionalities 110 if the network 104 is a home network 104. By comparison, the functionality identification block/module 114 may determine another set of wireless communication device functionalities 110 if the network 104 is a roaming network 104. The wireless communication device functionalities 110 associated with a roaming network 104 may be a subset of the wireless communication device functionalities 110 associated with a home network 104, for example. Additionally or alternatively, the wireless communication device functionalities 110 that are associated with a roaming network 104 may include a set of failsafe functionalities that would allow the wireless communication device 102 to operate outside a home network 104. In some configurations, the functionality identification block/module 114 may compare a network 104 in communication with the wireless communication device 102 with a network identifier 108 to determine if the network 104 is a roaming network 104 or a home network 104.

In some implementations, the functionality identification block/module 114 may determine the set of wireless communication device functionalities 110 independently. For example, the functionality identification block/module 114 may determine the wireless communication device functionalities 110 independent of sending a message to another device and may do so independent of negotiating or requesting wireless communication device functionalities 110.

The functionality identification block/module 114 may include a functionality table 106. The functionality table 106 may map a set of wireless communication device functionalities 110 to one or more networks 104 (e.g., network identifiers 108). For example, the functionality table 106 may list one or more network identifiers 108 associated with one or more networks 104. In some configurations, the list of network identifiers 108 may correspond to one or more home networks 104 and one or more roaming networks 104. The one or more roaming networks 104 listed may correspond to roaming network 104 carriers that have roaming agreements with a home network 104 carrier. The functionality table 106 may list one or more wireless communication device functionalities 110 (e.g., the wireless communication device behaviors, customizations, services, features, functions, applications and/or specific customizations per a network carrier) that are associated with the one or more networks 104. In some configurations, the functionality table 106 may list the wireless communication device functionalities 110 according to the network 104 with which they are associated.

An example of a functionality table 106 configured in this fashion is given as follows. The functionality table 106 may list one or more network identifiers 108 associated with one or more home networks 104. The functionality table 106 may also list the wireless communication device functionalities 110 that are associated with the one or more home networks 104. In some examples, the wireless communication device functionalities 110 that are associated with the one or more home networks 104 may be sorted according to the home network 104. In some cases, the wireless communication device functionalities 110 that are associated with the one or more home networks 104 may indicate how the wireless communication device 102 capabilities are applied.

Continuing this example, the functionality table 106 may list one or more network identifiers 108 associated with one or more roaming networks 104. The functionality table 106 may also list the wireless communication device functionalities 110 that are associated with the one or more roaming networks 104. In some examples, the wireless communication device functionalities 110 that are associated with the one or more roaming networks 104 may be sorted according to the roaming network 104. The wireless communication device functionalities 110 that are associated with the one or more roaming networks 104 may include wireless communication device functionalities 110 as set forth in one or more roaming agreements between one or more roaming network 104 carriers and a home network 104 carrier.

In some configurations, the functionality table 106 may list the one or more network identifiers 108 according to the wireless communication device functionalities 110 with which they are associated. An example of a functionality table 106 configured in this fashion is given as follows. The functionality table 106 may list one or more wireless communication device functionalities 110. The functionality table 106 may also list the network identifiers 108 that correspond to the networks 104 that are associated with the one or more wireless communication device functionalities 110. In some examples, the network identifiers 108 that are associated with the one or more wireless communication device functionalities 110 may be sorted according to the wireless communication device functionalities 110.

In some implementations, the functionality table 106 may be stored on memory (not shown) included in and/or coupled to the wireless communication device 102. For example, the functionality table 106 may be stored on a subscriber identity module (SIM) card of the wireless communication device 102.

In some implementations, the functionality table 106 may include one or more network identifiers 108. The network identifiers 108 may include information that identifies one or more networks 104. For example, a network identifier 108 may include a public land mobile network identification (PLMN ID) that identifies the network 104 that is in communication with the wireless communication device 102. Other examples of network identifiers 108 include, but are not limited to, a mobile country code and a subnet identification (subnet ID).

In some implementations, the network identifier 108 may indicate the type of network 104. For example, the network identifier 108 (e.g., the public land mobile network identification), may indicate that a network 104 is a home network 104. Similarly, the network identifier 108 (e.g., the public land mobile network identification), may indicate that a network 104 is a roaming network 104.

The functionality table 106 may also include a list of one or more wireless communication device functionalities 110. The wireless communication device functionalities 110 may be based on the network 104. For example, one network 104 may allow and/or require certain wireless communication device functionalities 110 (for certain wireless communication devices 102, for example), while another network 104 may allow and/or require other wireless communication device functionalities 110 (for certain wireless communication devices 102, for example).

The wireless communication device functionalities 110 may dictate how a wireless communication device 102 may behave in communicating with a network 104 that is in communication with the wireless communication device 102. In one configuration, a wireless communication device functionalities 110 may include one or more of wireless communication device behaviors, customizations, services, features, functions, applications and/or specific customizations per a network carrier. For example, a wireless communication device functionality 110 (e.g., a customization) may instruct a wireless communication device 102 to detach from a network 104 (e.g., a Long Term Evolution network) when the wireless communication device 102 fails an IP multimedia subsystem registration. In another example, the wireless communication device functionality 110 (e.g., a customization) may direct a wireless communication device 102 to cycle through one or more public land mobile networks 104 if a wireless communication device 102 cannot get network 104 service. Additionally or alternatively, the wireless communication device functionality 110 may prevent a wireless communication device 102 from using a network 104 when a failure of the network 104 has occurred. In this example, the wireless communication device functionality 110 may direct the wireless communication device 102 to initiate a network 104 discovery and attach to a discovered network 104. The wireless communication device functionality 110 (e.g., customization) may also direct a wireless communication device 102 to attempt a certain number of registrations (e.g., IMS registrations) before detaching from the network 104. A wireless communication device functionality 110 (e.g., customization) may include one or more session initiation protocol quality of service preconditions. Other examples of wireless communication device functionalities 110 (e.g., services) include instant messaging, video sharing, file sharing and video telephony, voice over internet protocol (e.g., VoIP) service, short message system (SMS) service, enhanced 911 (e911), etc.

The functionality table 106 may list the wireless communication device functionalities 110 based on the network 104 they apply to. For example, a set of wireless communication device functionalities 110 may be associated with a network 104 and may be listed accordingly. In some configurations, the wireless communication device functionalities 110 that are associated with a network 104 may be based on a roaming agreement if the network 104 is a roaming network 104. In another example, the functionality table 106 may list one or more network identifiers 108 associated with one or more networks 104 based on the wireless communication device functionality 110 they apply to. For example, one or more networks 104 may be associated with a wireless communication device functionality 110 and may be listed accordingly.

The functionality control block/module 112 may be coupled to the functionality identification block/module 114. In some examples, the functionality control block/module 112 may enable or disable one or more of the wireless communication device functionalities 110 on the wireless communication device 102. For example, the functionality control block/module 112 may detach the wireless communication device 102 from the network 104 when the wireless communication device 102 fails an IP multimedia subsystem registration, in accordance with a wireless communication device functionality 110. In another example, the functionality control block/module 112 may direct the wireless communication device 102 to cycle through one or more networks 104 if the wireless communication device 102 cannot get network 104 service. In some cases, the functionality control block/module 112 may prevent the wireless communication device 102 from using a network 104 when a failure of the network 104 has occurred. In this example, the functionality control block/module 112 may initiate a network 104 discovery and attach the wireless communication device 102 to a discovered network 104. The functionality control block/module 112 may attempt a certain number of registrations before detaching from the network 104.

Other examples of wireless communication device functionalities 110 that the functionality control block/module 112 may enable and/or disable include, but are not limited to, session initiation protocol quality of service preconditions, instant messaging service, video sharing, file sharing, video telephony, voice over internet protocol, short message system, enhanced 911, etc.

Figure 2:
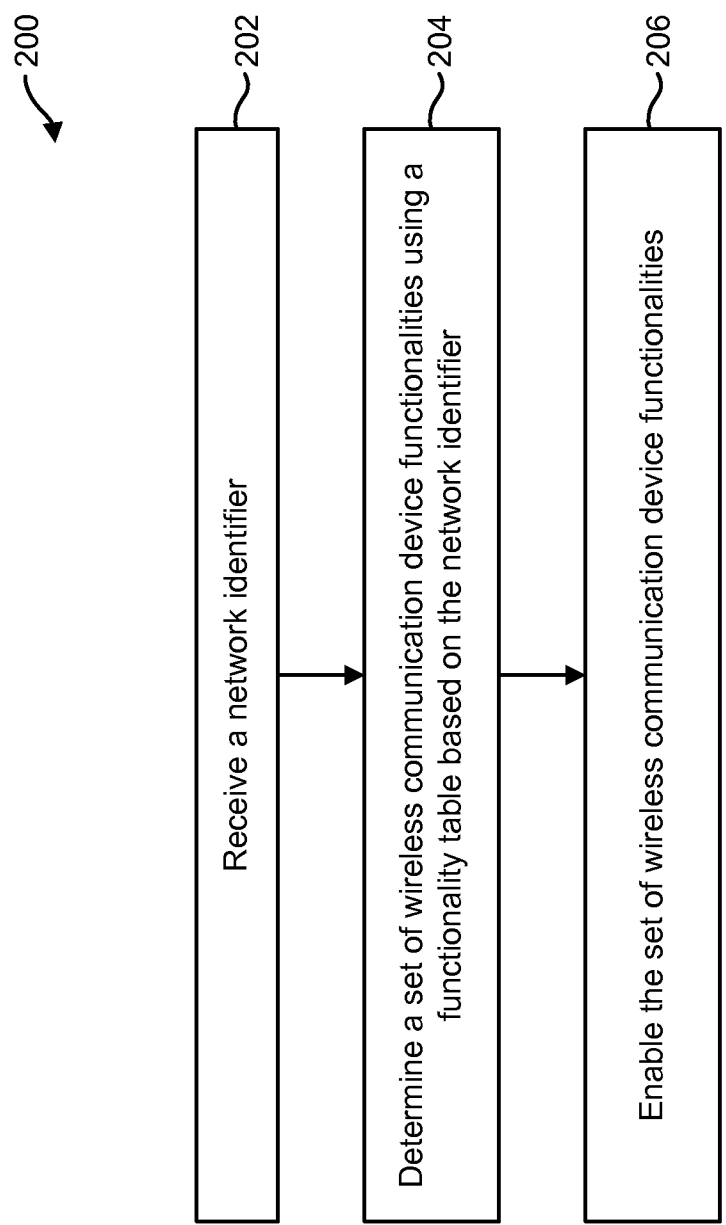
FIG. 2 is a flow diagram illustrating one configuration of a method for dynamic enablement of wireless communication device functionalities.

FIG. 2 is a flow diagram illustrating one configuration of a method 200 for dynamic enablement of wireless communication device functionalities 110. The method 200 may be performed by a wireless communication device 102. The wireless communication device 102 may receive 202 a network identifier 108. For example, the wireless communication device 102 may receive 202 a network identifier 108 from the network 104. For instance, the wireless communication device 102 may search for public land mobile networks in one or more bands. Upon camping on a public land mobile network, the wireless communication device 102 may receive 202 a network identifier 108 corresponding to that network 104.

The functionality identification block/module 114 of the wireless communication device 102 may determine 204 a set of wireless communication device functionalities 110 using a functionality table 106 based on network identifier 108. As used herein, a "set" of wireless communication device functionalities 110 may include one or more of the wireless communication device functionalities 110 available to (e.g., stored on) the wireless communication device 102. The functionality identification block/module 114 may determine 204 the set of wireless communication device functionalities 110 using a functionality table 106 that maps a set of wireless communication device functionalities 110 to one or more network identifiers 108 that correspond to one or more networks 104. For example, the functionality table 106 may map wireless communication device functionalities 110 that are associated with a home network 104 to that home network identifier 108. Similarly, the functionality table 106 may map wireless communication device functionalities 110 that are associated with a roaming network 104 to that roaming network identifier 108. In some implementations, one or more wireless communication device functionalities 110 may correspond to multiple networks 104. For example, a wireless communication device functionality 110 may correspond to a home network 104 and a roaming network 104.

The wireless communication device functionalities 110 may include a set of one or more wireless communication device behaviors, customizations, services, features, functions, applications and/or specific customizations per a network carrier that dictate how the wireless communication device 102 may behave in communicating with a network 104 that is in communication with the wireless communication device 102. Examples of wireless communication device functionalities 110 may include detaching from a network 104, cycling through one or more networks 104, preventing connection with a network 104, initiating network 104 discovery, attempting a certain number of connections and applying one or more services.

The functionality identification block/module 114 may determine 204 the set of wireless communication device functionalities 110 based on the network 104. For example, the functionality identification block/module 114 may determine a set of wireless communication device functionalities 110 associated with one network 104 and may determine a set of other wireless communication device functionalities 110 associated with another network 104.

The functionality identification block/module 114 may determine 204 the set of wireless communication device functionalities 110 based on the type of network 104. For example, the functionality identification block/module 114 may determine a set of wireless communication device functionalities 110 associated with a home network 104. In another example, the functionality identification block/module 114 may determine wireless communication device functionalities 110 associated with a roaming network 104. In some cases, the wireless communication device functionalities 110 associated with a roaming network 104 may be a subset of the wireless communication device functionalities 110 associated with a home network 104. In other cases, the set of wireless communication device functionalities 110 associated with a roaming network 104 may overlap the set of wireless communication device functionalities 110 associated with a home network 104. For instance, the set of wireless communication device functionalities 110 associated with the roaming network 104 may include one or more wireless communication device functionalities 110 that are not included in the set of wireless communication device functionalities 110 associated with the home network 104. In other cases, the set of wireless communication device functionalities 110 associated with the roaming network 104 may be disjoint from the set of wireless communication device functionalities 110 associated with the home network 104

The functionality identification block/module 114 may determine 204 the set of wireless communication device functionalities 110 based on a network identifier 108. As described above, the network identifier 108 of the functionality table 106 may include information pertaining to the one or more networks 104. In this example, the functionality identification block/module 114 may use the network identifier 108 to identify the network 104 and the corresponding wireless communication device functionalities 110. Examples of the network identifier 108 include public land mobile network identification, mobile country code and subnet identification.

The functionality control block/module 112 may enable 206 the set of wireless communication device functionalities 110. As described above, the functionality control block/module 112 may enable 206 one or more wireless communication device functionalities 110 based on the network 104. For example, the functionality control block/module 112 may enable 206 the determined 204 set of wireless communication device functionalities 110 associated with a home network 104 that is in communication with the wireless communication device 102. Similarly, the functionality control block/module 112 may enable 206 the set of wireless communication device functionalities 110 associated with a roaming network 104 that is in communication with the wireless communication device 102. Examples of wireless communication device functionalities 110 that the functionality control block/module 112 may enable may include detaching from a network 104, cycling through one or more public land mobile networks 104, preventing connection with a network 104, initiating network 104 discovery, attempting a certain number of connections and applying one or more services.

Figure 3:
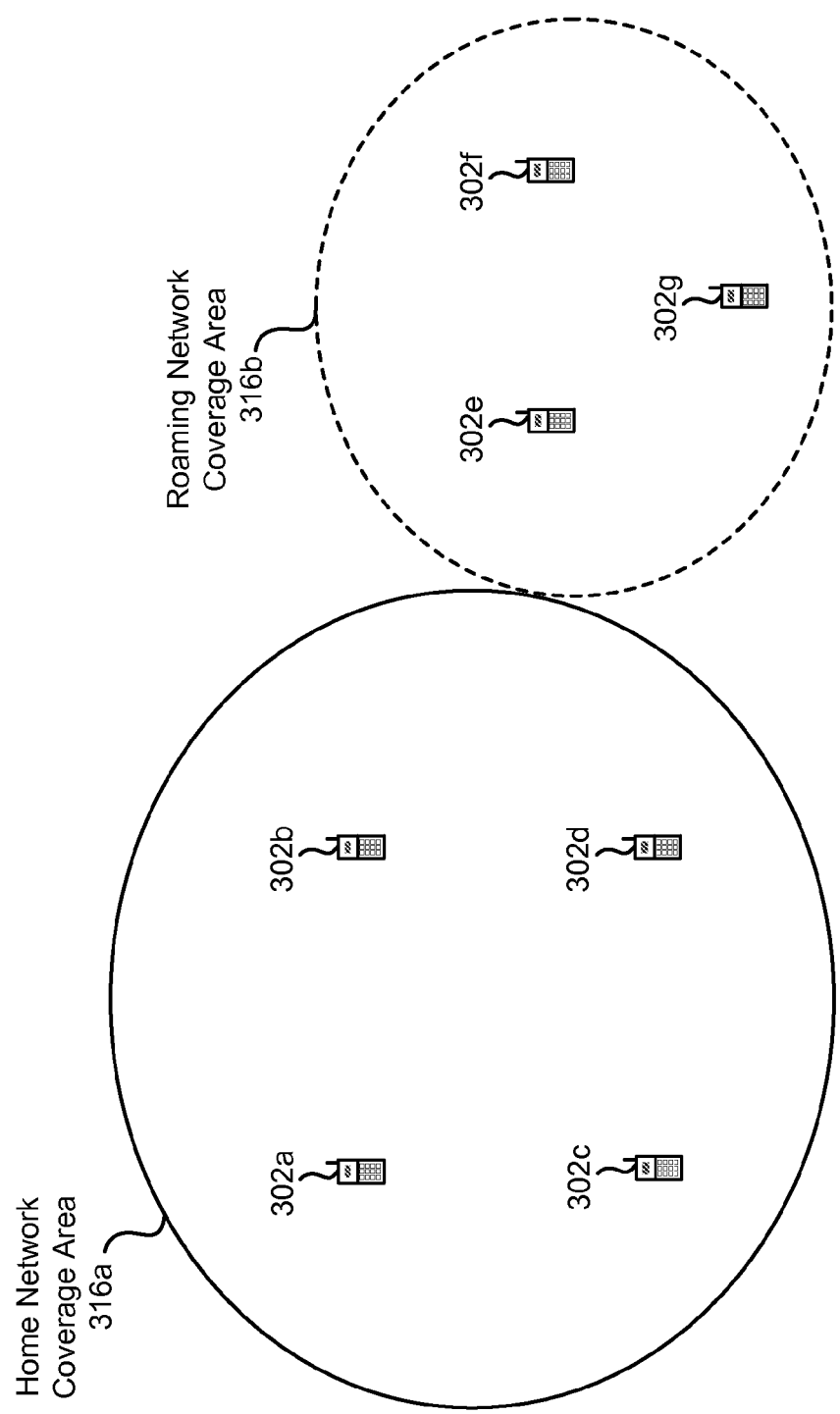
FIG. 3 is a diagram illustrating one example of several wireless communication devices in a home network coverage area and a roaming network coverage area in which wireless communication device functionalities are established.

FIG. 3 is a diagram illustrating one example of several wireless communication devices 302a-g in a home network coverage area 316a and a roaming network coverage area 316b in which wireless communication device functionalities 110 are established. The wireless communication devices 302a-g may be examples of the wireless communication device 102 described in connection with FIG. 1. In this example, several wireless communication devices 302a-d are located in a home network coverage area 316a. As described above, a home network 104 may be a network 104 where communication service is registered. The home network coverage area 316a may refer to the geographic area where communication service may be provided by the home network 104. Additionally, several wireless communication devices 302*e-g* are located in a roaming network coverage area 316*b* in this example. As described above, a roaming network 104 may be a network 104 that is not a home network 104. A roaming network coverage area 316*b* may refer to the geographic area where communication service may be provided by a roaming network 104.

In some implementations, the wireless communication device functionalities 110 are determined based on the network 104. For example, a wireless communication device 302*a-d* that is located in a home network coverage area 316*a* may enable the wireless communication device functionalities 110 that correspond to the home network 104. In some configurations, the wireless communication device functionalities 110 that correspond to the home network 104 may correspond to all wireless communication device functionalities 110.

In another example, a wireless communication device 302*e-g* that is located in a roaming network coverage area 316*b* may enable the wireless communication device functionalities 110 that correspond to a roaming network 104. The wireless communication device functionalities 110 that correspond to a roaming network 104 may correspond to a set of the wireless communication device functionalities 110. In some cases the wireless communication device functionalities 110 that correspond to a roaming network 104 may be a subset of the wireless communication device functionalities 110 that correspond to a home network. In some examples, the wireless communication device functionalities 110 that correspond to a roaming network 104 may be based on roaming agreements. While FIG. 3 depicts one roaming network coverage area 316*b*, any number of roaming network coverage areas 316*b* may be available to the wireless communication devices 302*a-g*.

Figure 4:
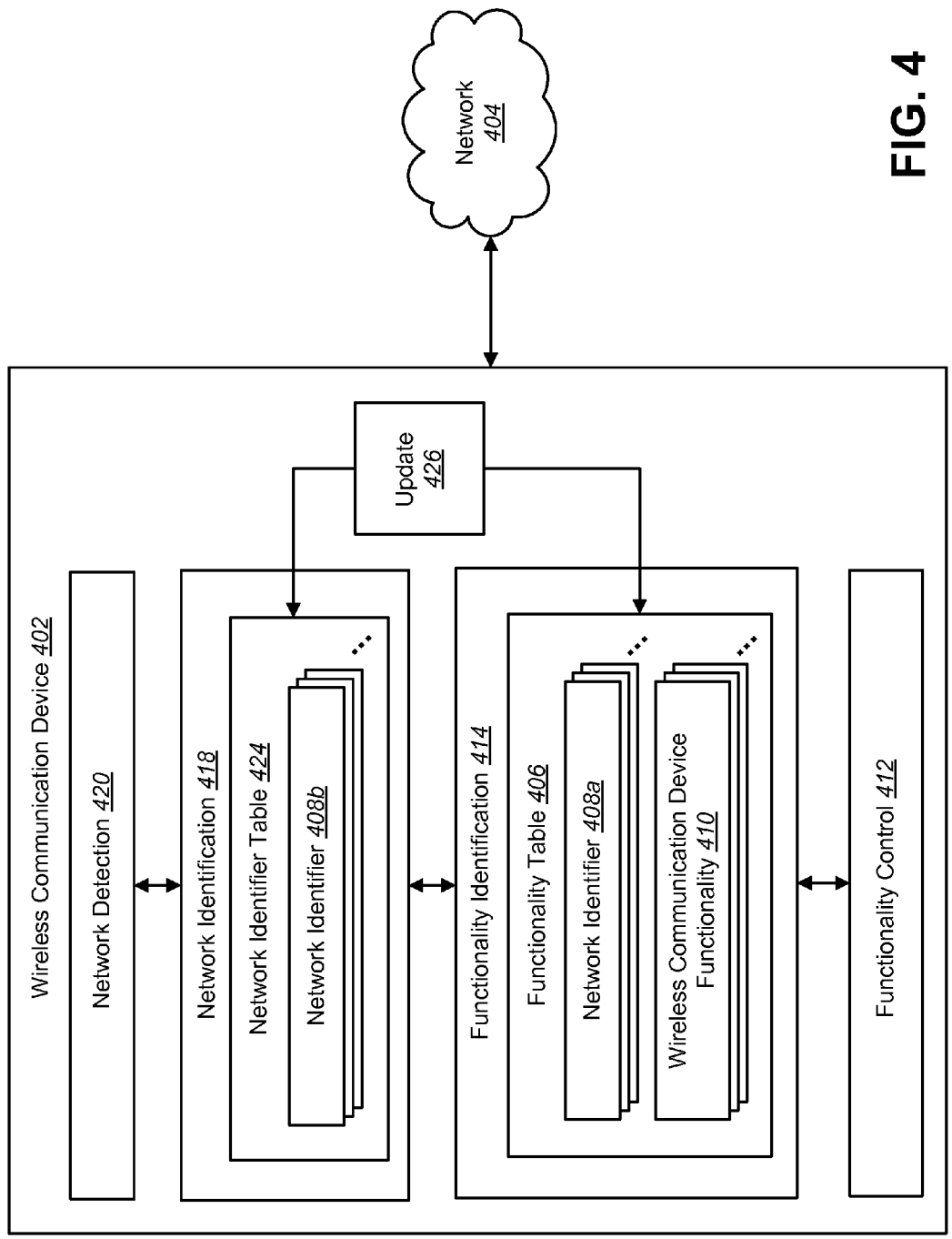
FIG. 4 is a block diagram illustrating a more specific configuration of a wireless communication device and a network in which systems and methods for dynamic enablement of wireless communication device functionalities may be implemented.

FIG. 4 is a block diagram illustrating a more specific configuration of a wireless communication device 402 and a network 404 in which systems and methods for dynamic enablement of wireless communication device functionalities 410 may be implemented. The wireless communication device 402 may be one example of the wireless communication device 102 described in connection with FIG. 1.

The wireless communication device 402 may include a functionality identification block/module 414 and/or a functionality control block/module 412 that may be example(s) of corresponding elements described in connection with FIG. 1. The functionality identification block/module 414 may include a functionality table 406 with one or more network identifiers 408*a* and one or more wireless communication device functionalities 410 that may be examples of corresponding elements described in connection with FIG. 1. The wireless communication device 402 may be connected to a network 404 that may be an example of the network 104 described in connection with FIG. 1.

In some configurations, the wireless communication device 402 may include a network detection block/module 420 and a network identification block/module 418. The network detection block/module 420 may detect a network 404 that is in communication with the wireless communication device 402. As described above, the network 404 may use different technologies to communicate with the wireless communication device 402. Examples of the different network 104 technologies include Long Term Evolution (LTE), High Speed Packet Access (HSPA), Evolved High Speed Packet Access (HSPA+), Universal Mobile Telecommunications System (UMTS), High Rate Packet Data (HRPD), Enhanced High Rate Packet Data (eHRPD), Institute of Electrical and Electronics Engineers (IEEE) 802.11 (Wi-Fi), Interworking-Wireless Local Area Network (iWLAN) and Worldwide Interoperability for Microwave Access (WiMAX).

The network identification block/module 418 may be coupled to the network detection block/module 420. The network identification block/module 418 may identify a detected network 404 that is in communication with the wireless communication device 402. In some configurations, the network identification block/module 418 may identify the type of network 404. For example, the network identification block/module 418 may identify whether the network 404 is a home network 404 or a roaming network 404. In some configurations, the network identification block/module 418 may be coupled to the functionality identification block/module 414. In this configuration, the network identification block/module 418 may share information with the functionality identification block/module 414, for example, the network identifiers 408*a-b*.

The network identification block/module 418 may include a network identifier table 424. The network identifier table 424 may identify one or more networks 404. For example, the network identifier table 424 may identify one or more home networks 404 and roaming networks 404 of carriers that have roaming agreements with a home network 404 carrier. The network identifier table 424 may identify the type of the one or more networks 404. For example, the network identifier table 424 may indicate whether a network 404 is a home network 404 or a roaming network 404.

The network identifier table 424 may identify the networks 404 using one or more network identifiers 408*b*. Examples of network identifiers 408*b* include, but are not limited to public land mobile network identifications, mobile country codes and subnet identifications.

In some implementations, the network identifier table 424 may be stored on memory (not shown) included in and/or coupled to the wireless communication device 402. For example, the network identifier table 424 may be stored on the subscriber identity module (SIM) card of the wireless communication device 402.

In some configurations, the network identifier table 424 may be known to the wireless communication device 402. In other words, the wireless communication device 402 may obtain the network identifier table 424 independent of any message exchange with another electronic device. For example, the network identifier table 424 may be stored on the wireless communication device during manufacture.

The network identification block/module 418 may compare a detected network 404 to the network identifier table 424 to identify the network 404. For example, the network identification block/module 418 may compare a network identifier of the detected network 404 to the network identifiers 408*b* listed in the network identifier table 424 to obtain information about the detected network 404, for example whether the detected network 404 is a home network 404 or a roaming network 404.

The update block/module 426 may be coupled to the network identification block/module 418 and/or the functionality identification block/module 414. In some implementations, the update block/module 426 may update the network identifier table 424. For example, the update block/module 426 may add or delete one or more network identifiers 408*b* from the network identifier table 424. The update block/module 426 may also update the network identifiers 408*b*. For example, the update block/module 426 may modify one or more network identifiers 408*b*. In some configurations, the update block/module 426 may update the functionality table 406. As described above, updating the functionality table 406 may include adding, removing and/or modifying one or more network identifiers 408a. In some configurations, the update block/module 426 may additionally or alternatively update settings that define one or more wireless communication device functionalities 410. In some implementations, the update block/module 426 may update the network identifier table 424 and/or the functionality table 406 over the air, for example using an open mobile alliance (OMA) device management (DM) update procedure.

In some configurations, the update block/module 426 may update the network identifier table 424 and/or the functionality table 406 based on received input. For example, a user of the wireless communication device 402 may input a new network identifier 408a-b to be added to the network identifier table 424 and/or the functionality table 406. Based on this input, the update block/module 426 may add a network identifier 408a-b to the network identifier table 424 and/or the functionality table 406. Similarly, the update block/module 426 may remove and/or modify the network identifier table 424 and/or the functionality table 406 based on user input. The received input may additionally or alternatively originate from the network 404. For example, the network 404 may input a new network identifier 408a-b to be added to the network identifier table 424 and/or the functionality table 406. Based on this input, the update block/module 426 may add a network identifier 408a-b to the network identifier table 424 and/or the functionality table 406. Similarly, the update block/module 426 may remove and/or modify the network identifier table 424 and/or the functionality table 406 based on network 404 input. In some configurations, the wireless communication device functionalities 410 may not be updated based on signaling received from the network 404. In other configurations, the wireless communication device functionalities 410 may be updated based on signaling received from the network 404.

Figure 5:
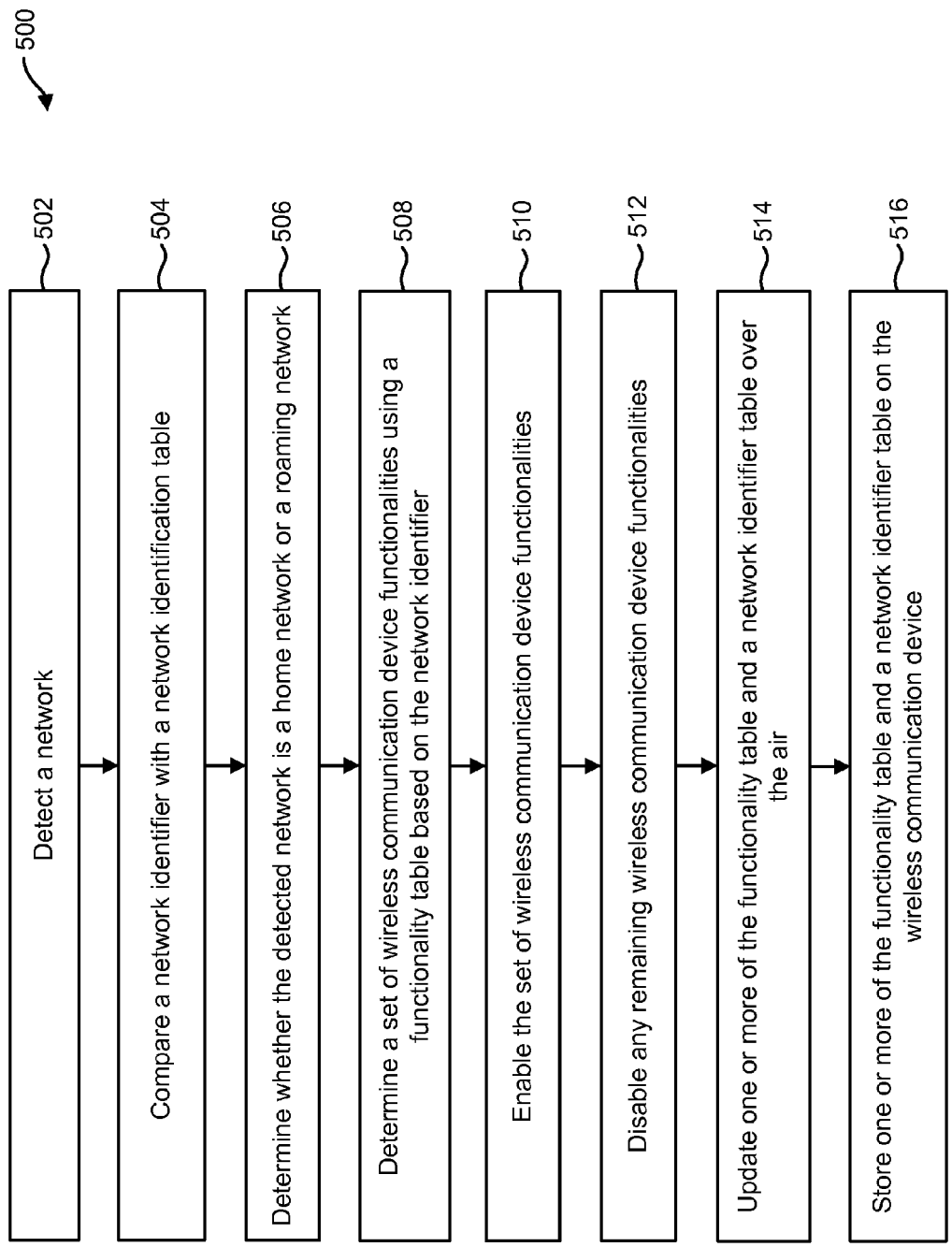
FIG. 5 is a flow diagram illustrating another configuration of a method for dynamic enablement of wireless communication device functionalities.

FIG. 5 is a flow diagram illustrating another configuration of a method 500 for dynamic enablement of wireless communication device functionalities 110. The method 500 may be performed by a wireless communication device 402. The network detection block/module 420 of the wireless communication device 402 may detect 502 a network 404. More specifically, the network detection block/module 420 may detect 502 a network 404 that may be capable of communicating with the wireless communication device 402.

The network identification block/module 418 may compare 504 the detected network 404 (e.g., a received network identifier 408a-b) with a network identifier table 424. For example, the network identification block/module 418 may compare 504 a network identifier of the detected network 404 to the network identifiers 408b listed in the network identifier table 424 to obtain information about the detected network 404.

In some configurations, the network identification block/module 418 may determine 506 whether the detected network 404 is a home network 404 or a roaming network 404. In some examples, the network identifier table 424 may specify whether the network 404 is a home network 404 or a roaming network 404. In these examples, the network identification block/module 418 may use the network identifier table 424 information to determine 506 whether the detected network 404 is a home network 404 or a roaming network 404.

The functionality identification block/module 414 may determine 508 a set of wireless communication device functionalities 410 using a functionality table 406 based on a network identifier 408. In some implementations, this may be done as described in connection with FIG. 2. For example, if the network 404 is a home network 404, the functionality identification block/module 414 may determine 508 a set of wireless communication device functionalities 410 associated with the home network 404. As described above, this may include wireless communication device functionalities 410 that correspond to all the wireless communication device functionalities 410 listed on the functionality table 406. By comparison, if the network 404 is a roaming network 404, the functionality identification block/module 414 may determine 508 a set of wireless communication device functionalities 410 associated with the roaming network 404. Similarly, as described above, this may include wireless communication device functionalities 410 that correspond to a set of the wireless communication device functionalities 410 listed on the functionality table 406, as defined by a roaming agreement between the roaming network 404 carrier and a home network 404 carrier. In some cases, the portion of the wireless communication device functionalities 410 associated with the roaming network 404 may be a subset of the wireless communication device functionalities 410 associated with a home network 404.

The functionality control block/module 412 may enable 510 the set of wireless communication device functionalities 410. In some implementations, this may be done as described in connection with FIG. 2.

The functionality control block/module 412 may disable 512 remaining wireless communication device functionalities 410. For example, the functionality control block/module 412 may disable 512 the wireless communication device functionalities 410 that do not correspond to a network 404 (e.g., that are not allowed by a network 404). For example, if a network 404 is a roaming network 404, the functionality control block/module 412 may disable 512 that set of wireless communication device functionalities 410 that do not correspond to the roaming network 404. More specifically, if the roaming network 404 does not recognize session initiation protocol quality of standard preconditions, the functionality control block/module 412 may disable 512 session initiation protocol quality of standard preconditions on the wireless communication device 402, such that the wireless communication device 402 may have communication service in the roaming network 404.

The update block/module 426 may update 514 one or more of the functionality table 406 and a network identifier table 424. For example, the update block/module 426 may update 514 one or more of the functionality table 406 and a network identifier table 424 over the air. In some cases, the update block/module 426 may update 514 one or more of the functionality table 406 and a network identifier table 424 based on received input, for example from a user. For example, the update block/module 426 may add, remove or modify one or more network identifiers 408a-b of the network identifier table 424 and/or the functionality table 406. For example, if a roaming network 404 carrier no longer has a roaming agreement with a home network 404 carrier, the update block/module 426 may remove the network identifiers 408a-b corresponding to this network 404 from the network identifier table 424 and/or the functionality table 406. In some implementations, the update block/module 426 may update the network identifier table 424 and/or the functionality table 406 over the air, for example using an open mobile alliance (OMA) device management (DM) update procedure.

The wireless communication device 402 may store 516 one or more of the functionality table 406 and a network identifier table 424 on the wireless communication device 402. For example, the network identifier table 424 may be stored on the subscriber identity module (SIM) card of the wireless communication device 402.

Figure 6:
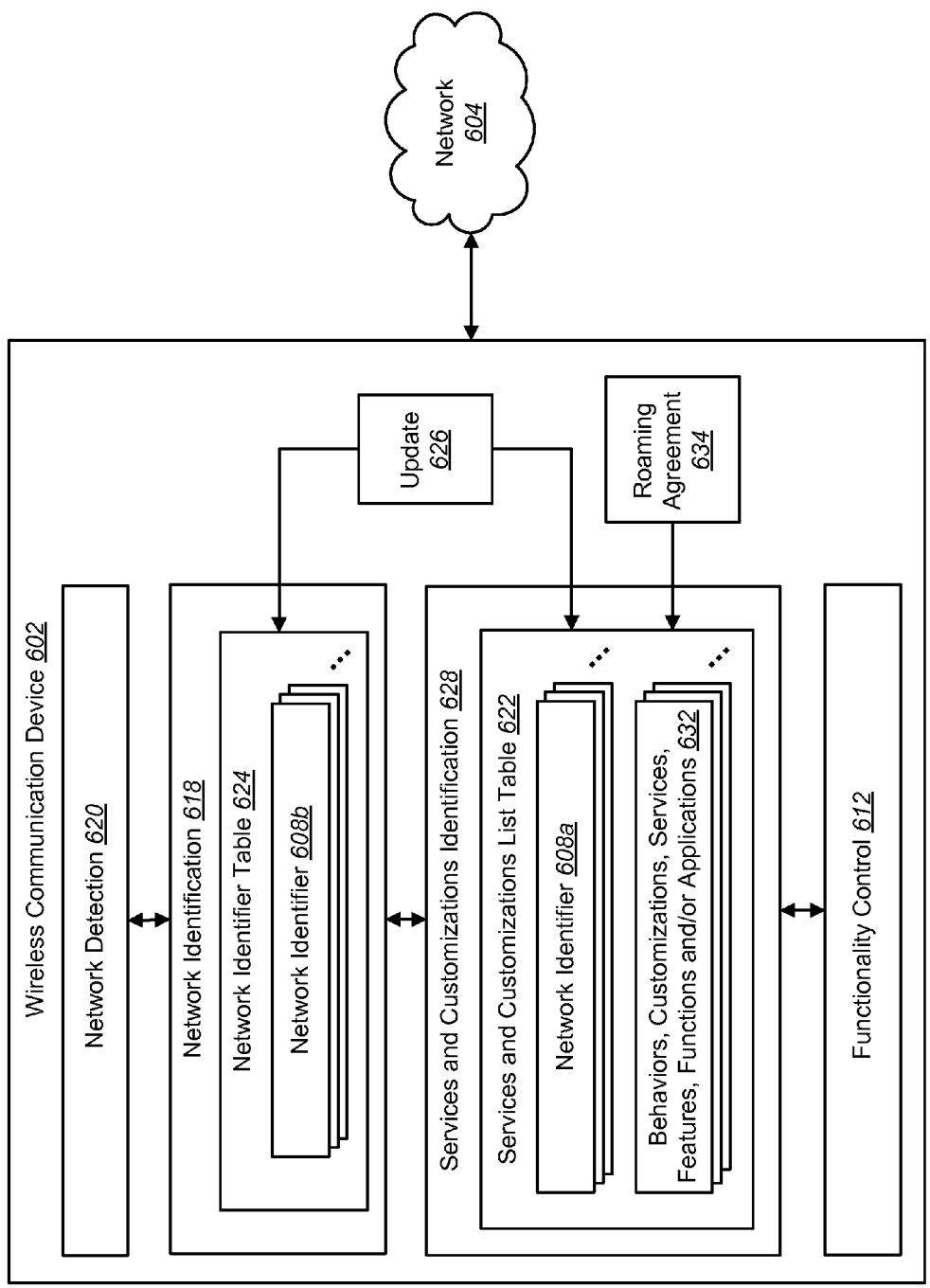
FIG. 6 is a block diagram illustrating another more specific configuration of a wireless communication device and a network in which systems and methods for dynamic enablement of wireless communication device functionalities may be implemented.

FIG. 6 is a block diagram illustrating another more specific configuration of a wireless communication device 602 and a network 604 in which systems and methods for dynamic enablement of wireless communication device functionalities 410 may be implemented. The wireless communication device 602 may be one example of the wireless communication device 102 described in connection with FIG. 1. The wireless communication device 602 may communicate with a network 604 that may be one example of the network 104 described in connection with FIG. 1.

The wireless communication device 602 may include a network detection block/module 620, a network identification block/module 618, a functionality control block/module 612 and/or an update block/module 626, which may be examples of corresponding elements described in connection with FIGS. 1 and/or 4 in some configurations. The network identification block/module 618 may include a network identifier table 624 that may be an example of the network identifier table 424 described in connection with FIG. 4. The network identifier table 624 may identify the networks 604 using one or more network identifiers 608b. In some implementations, the network identifiers 608b may be examples of corresponding elements described in connection with FIG. 4.

The wireless communication device 602 may include a services and customizations identification block/module 628. In some configurations, the services and customizations identification block/module 628 may be an example of the functionality identification block/module 114 described in connection with FIG. 1. The services and customizations identification block/module 628 may determine a set of behaviors, customizations, services, features, functions and/or applications 632. As described above, the behaviors, customizations, services, features, functions and/or applications 632 may be one example of the wireless communication device functionalities 110 described earlier.

The services and customizations identification block/module 628 may determine the set of one or more behaviors, customizations, services, features, functions and/or applications 632 based on the network 604. More specifically, the services and customizations identification block/module 628 may determine the set of behaviors, customizations, services, features, functions and/or applications 632 based on the network 604 in communication with the wireless communication device 602. In some configurations, the services and customizations identification block/module 628 may determine the behaviors, customizations, services, features, functions and/or applications 632 based on the type of network 604. For example, the services and customizations identification block/module 628 may determine one set of behaviors, customizations, services, features, functions and/or applications 632 if the network 604 is a home network 604. By comparison, the services and customizations identification block/module 628 may determine another set of behaviors, customizations, services, features, functions and/or applications 632 if the network 604 is a roaming network 604. In some cases, the behaviors, customizations, services, features, functions and/or applications 632 associated with a roaming network 604 may be a subset of the behaviors, customizations, services, features, functions and/or applications 632 associated with a home network 604, for example. In some configurations, the services and customizations identification block/module 628 may compare a network 604 in communication with the wireless communication device 602 with a network identifier 608a to determine if the network 604 is a roaming network 604 or a home network 604.

The services and customizations identification block/module 628 may include a services and customizations list table 622. The services and customizations list table 622 may be an example of the functionality table 106 described in connection with FIG. 1. The services and customizations list table 622 may map one or more behaviors, customizations, services, features, functions and/or applications 632 to one or more networks 604. For example, the services and customizations list table 622 may list one or more network identifiers 608a that correspond to one or more networks 604. In this configuration, the services and customizations list table 622 may list one or more behaviors, customizations, services, features, functions and/or applications 632 that are associated with the one or more networks 604.

In some implementations, the services and customizations list table 622 may be stored on memory (not shown) included in and/or coupled to the wireless communication device 602. For example, the services and customizations list table 622 may be stored on a subscriber identity module (SIM) card of the wireless communication device 602.

In some implementations, the services and customizations list table 622 may include one or more network identifiers 608a that may be examples of network identifiers 108a described in connection with FIG. 1. The services and customizations list table 622 may also include a list of one or more behaviors, customizations, services, features, functions and/or applications 632. In some implementations, the behaviors, customizations, services, features, functions and/or applications 632 may be an example of the wireless communication device functionalities 110 described in connection with FIG. 1. For instance, the services and customizations list table 622 may include a list (e.g., a services and customizations list) of one or more behaviors, customizations, services, features, functions and/or applications 632 mapping to one or more network identifiers 608a. In some implementations, a services and customizations list may be a list of items, where one or more of the items may be updated. For example, a master services and customizations list table 622 may include one or more subset services and customizations list tables mapping to a particular carrier or operator (via one or more network identifiers 608a, for example).

In some configurations, a roaming agreement 634 may be coupled to the services and customizations list table 622. The roaming agreement 634 may be an agreement between a roaming network 604 carrier and a home network 604 carrier that specifies which wireless communication device functionalities 610 may be associated with the roaming network 604. In other words the roaming agreement 634 may indicate to the services and customizations identification block/module 628 which behaviors, customizations, services, features, functions and/or applications 632 should be enabled or disabled. For example, a roaming agreement 634 may indicate that video sharing is not associated with the roaming network 604. In this example, the services and customizations identification block/module 628 may determine that video sharing is a behaviors, customizations, services, features, functions and/or applications 632 that is not associated with the roaming network 604. The functionality control block/module 612 may then disable video sharing on the wireless communication device 602.

FIG. 7 is a diagram illustrating one example of a functionality table 706 that may be used to establish wireless communication device functionalities 710. The functionality table 706 may be an example of the functionality table 106 described previously in connection with FIG. 1. The functionality table 706 may include one or more network identifiers 708a-c and one or more wireless communication device functionalities 710a-d that may be examples of corresponding elements described in connection with FIG. 1.

As described above, the functionality table 706 may list a set of wireless communication device functionalities 710*a-d* that are associated with one or more networks 104. In some configurations, the functionality table 706 may list the wireless communication device functionalities 710*a-d* according to the network 104 with which they are associated. An example of a functionality table 706 configured in this fashion is given in FIG. 7.

The functionality table 706 may list one or more network identifiers 708*a-c*. In some configurations, one or more of the network identifiers 708*a-c* may refer to one or more home networks 104 and/or one or more roaming networks 104. The functionality table 706 may list the wireless communication device functionalities 710*a-d* that are associated with the one or more network identifiers 708*a-c*. For example, wireless communication device functionalities A-C 710*a-c* may be associated with network identifier A 708*a*. Similarly, wireless communication device functionalities B and C 710*b*, 710*c* may be associated with network identifier B 708*b*. Wireless communication device functionalities A and D 710*a*, 710*d* may be associated with network identifier C 708*c*. In one example of the systems and methods described herein, a wireless communication device 102 may determine 204 a set of wireless communication device functionalities A-C 710*a-c* based on network identifier A 708*a* (that matches a received 202 network identifier, for example) and may enable 206 the set of wireless communication device functionalities A-C 710*a-c*.

FIG. 8 is a diagram illustrating another example of a functionality table 806 in which systems and methods for dynamic enablement of wireless communication device functionalities 810 may be implemented. The functionality table 806 may be an example of the functionality table 106 described previously in connection with FIG. 1. The functionality table 806 may include one or more network identifiers 808*a-d* and one or more wireless communication device functionalities 810*a-c* similar to corresponding elements described in connection with FIG. 1.

As described above, the functionality table 806 may list network identifiers 808*a-d* that are associated with one or more wireless communication device functionalities 810*a-c*. In some configurations, the functionality table 806 may list the network identifiers 808*a-d* according to the wireless communication device functionalities 810*a-c* with which they are associated. In some examples, the network identifiers 808*a-d* may refer to one or more home networks 104 and/or one or more roaming networks 104. An example of a functionality table 806 configured in this fashion is given in FIG. 8.

The functionality table 806 may list one or more wireless communication device functionalities 810*a-c*. The functionality table 806 may list the network identifiers 808*a-d* that are associated with the one or more wireless communication device functionalities 810*a-c*. For example, network identifiers A-C 808*a-c* may be associated with wireless communication device functionality A 810*a*. Similarly, network identifiers B and C 808*b*, 808*c* may be associated with wireless communication device functionality B 810*b*. Network identifiers A and D 808*a*, 808*d* may be associated with wireless communication device functionality C 810*c*. In one example of the systems and methods described herein, a wireless communication device 102 may determine 204 a set of wireless communication device functionality A-B 810*a-b* based on network identifier B 808*b* (that matches a received 202 network identifier, for example) and may enable 206 the set of wireless communication device functionality A-B 810*a-b*.

Figure 9:
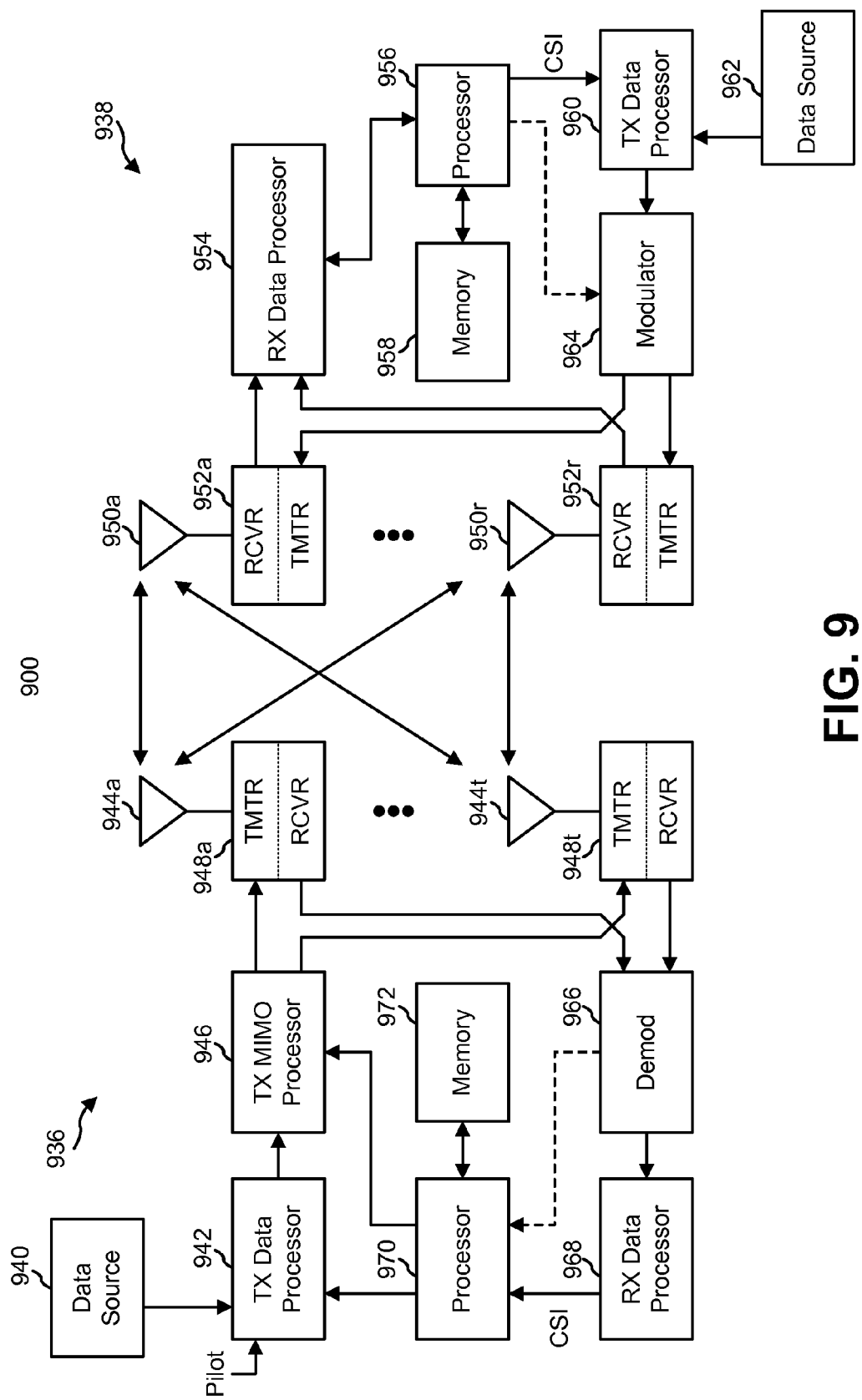
FIG. 9 is a block diagram of a transmitter and receiver in a multiple-input and multiple-output (MIMO) system.

FIG. 9 is a block diagram of a transmitter 936 and receiver 938 in a multiple-input and multiple-output (MIMO) system 900. Examples of transmitters 936 may include wireless communication devices 102, 302, 402 and 602. Additionally or alternatively, examples of receivers 938 may include wireless communication devices 102, 302, 402 and 602. In the transmitter 936, traffic data for a number of data streams is provided from a data source 940 to a transmit (TX) data processor 942. Each data stream may then be transmitted over a respective transmit antenna 944*a-t*. The transmit (TX) data processor 942 may format, code, and interleave the traffic data for each data stream based on a particular coding scheme selected for that data stream to provide coded data.

The coded data for each data stream may be multiplexed with pilot data (e.g., reference signals) using orthogonal frequency-division multiplexing (OFDM) techniques. The pilot data may be a known data pattern that is processed in a known manner and used at the receiver 938 to estimate the channel response. The multiplexed pilot and coded data for each stream is then modulated (i.e., symbol mapped) based on a particular modulation scheme (e.g., binary phase shift keying (BPSK), quadrature phase shift keying (QPSK), multiple phase shift keying (M-PSK) or multi-level quadrature amplitude modulation (M-QAM)) selected for that data stream to provide modulation symbols. The data rate, coding and modulation for each data stream may be determined by instructions performed by a processor.

The modulation symbols for all data streams may be provided to a transmit (TX) multiple-input multiple-output (MIMO) processor 946, which may further process the modulation symbols (e.g., for OFDM). The transmit (TX) multiple-input multiple-output (MIMO) processor 946 then provides NT modulation symbol streams to NT transmitters (TMTR) 948*a* through 948*t*. The TX transmit (TX) multiple-input multiple-output (MIMO) processor 946 may apply beamforming weights to the symbols of the data streams and to the antenna 944 from which the symbol is being transmitted.

Each transmitter 948 may receive and process a respective symbol stream to provide one or more analog signals, and further condition (e.g., amplify, filter, and upconvert) the analog signals to provide a modulated signal suitable for transmission over the MIMO channel. NT modulated signals from transmitters 948*a* through 948*t* are then transmitted from NT antennas 944*a* through 944*t*, respectively.

At the receiver 938, the transmitted modulated signals are received by NR antennas 950*a* through 950*r* and the received signal from each antenna 950 is provided to a respective receiver (RCVR) 952*a* through 952*r*. Each receiver 952 may condition (e.g., filter, amplify, and downconvert) a respective received signal, digitize the conditioned signal to provide samples, and further process the samples to provide a corresponding "received" symbol stream.

An RX data processor 954 then receives and processes the NR received symbol streams from NR receivers 952 based on a particular receiver processing technique to provide NT "detected" symbol streams. The RX data processor 954 then demodulates, deinterleaves and decodes each detected symbol stream to recover the traffic data for the data stream. The processing by RX data processor 954 may be complementary to that performed by TX MIMO processor 946 and TX data processor 942 at the transmitter 936.

A processor 956 may periodically determine which precoding matrix to use. The processor 956 may store information on and retrieve information from memory 958. The processor 956 formulates a reverse link message comprising a matrix index portion and a rank value portion. The reverse link message may be referred to as channel state information (CSI). The reverse link message may comprise various types of information regarding the communication link and/or the received data stream. The reverse link message is then processed by a TX data processor 960, which also receives traffic data for a number of data streams from a data source 962, modulated by a modulator 964, conditioned by transmitters 952a through 952r, and transmitted back to the transmitter 936.

At the transmitter 936, the modulated signals from the receiver are received by antennas 944, conditioned by receivers 948, demodulated by a demodulator 966 and processed by an RX data processor 968 to extract the reverse link message transmitted by the receiver 938 system. A processor 970 may receive channel state information (CSI) from the RX data processor 968. The processor 970 may store information on and retrieve information from memory 972. The processor 970 then determines which pre-coding matrix to use for determining the beamforming weights and then processes the extracted message. In some configurations, the receiver 938 illustrated in FIG. 9 may be implemented in one or more of the networks 104, 404 and 604 discussed above. The one or more wireless communication devices 102, 302, 402 and 602 discussed above may be configured similarly to the transmitter 936 illustrated in FIG. 9 in some configurations.

Figure 10:
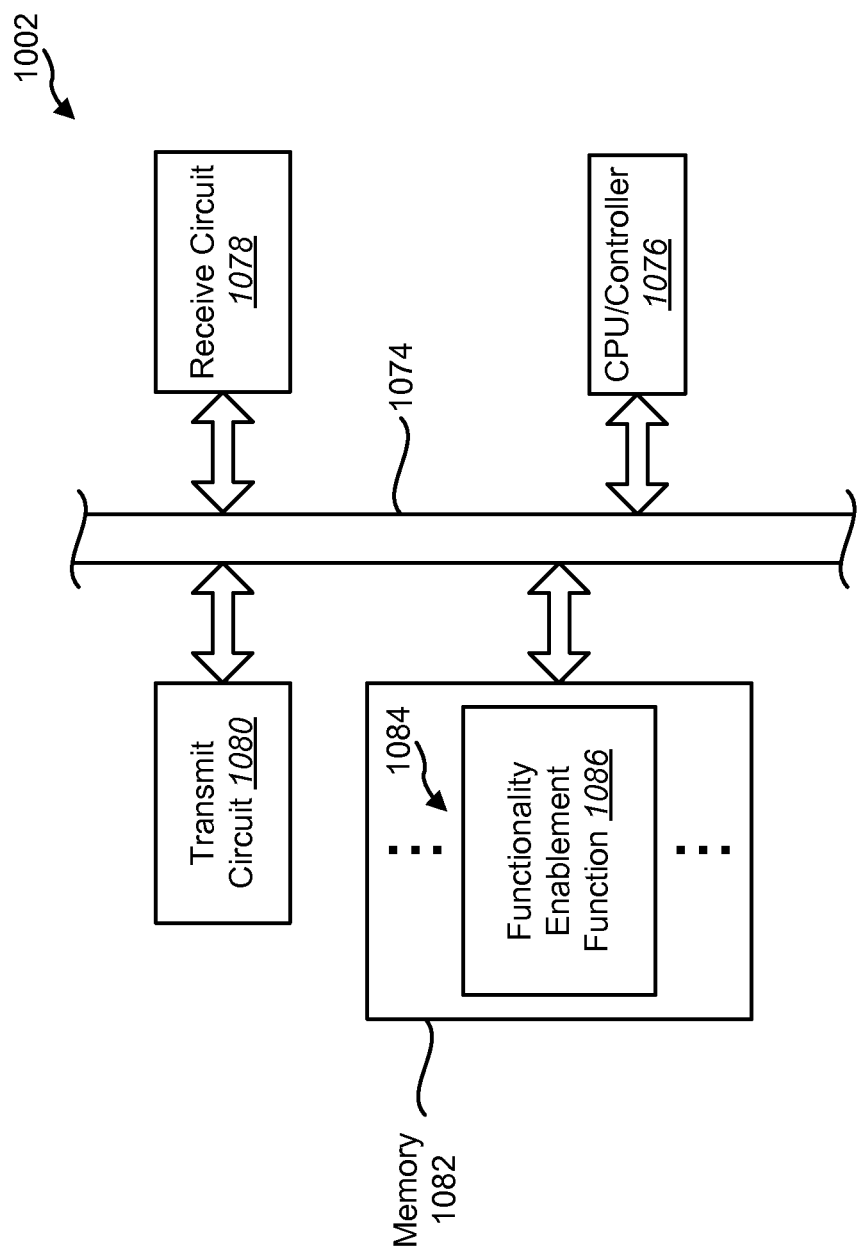
FIG. 10 shows part of a hardware implementation of an apparatus for executing the schemes or processes described herein.

FIG. 10 shows part of a hardware implementation of an apparatus 1002 for executing the schemes or processes as described above. The apparatus 1002 comprises circuitry as described below. In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks and the like, such as shown and described in FIG. 10. In this configuration, the circuit apparatus is signified by the reference numeral 1002 and can be implemented in any of the communication entities described herein, such as the wireless communication devices 102, 302, 402 and 602.

The apparatus 1002 comprises a central data bus 1074 linking several circuits together. The circuits include a CPU (Central Processing Unit) or a controller 1076, a receive circuit 1078, a transmit circuit 1080 and a memory unit 1082.

If the apparatus 1002 is part of a wireless device, the receive circuit 1078 and the transmit circuit 1080 can be connected to an RF (Radio Frequency) circuit (which is not shown in the drawing). The receive circuit 1078 processes and buffers received signals before sending the signals out to the data bus 1074. On the other hand, the transmit circuit 1080 processes and buffers the data from the data bus 1074 before sending the data out of the apparatus 1002. The CPU/controller 1076 performs the function of data management of the data bus 1074 and further the function of general data processing, including executing the instructional contents of the memory unit 1082.

The memory unit 1082 includes a set of modules and/or instructions generally signified by the reference numeral 1084. In this configuration, the modules/instructions include, among other things, a functionality enablement function 1086 which carries out the schemes and processes as described above. The function 1086 includes computer instructions or code for executing the process steps as shown and described in one or more of FIGS. 2 and 5. Specific instructions particular to an entity can be selectively implemented in the function 1086. For instance, if the apparatus 1002 is part of a wireless communication device 102, 302, 402 and 602, among other things, instructions particular to the wireless communication device 102, 302, 402 and 602 as shown and described in FIGS. 2 and 5 can be coded in the function 1086.

In this configuration, the memory unit 1082 is a RAM (Random Access Memory) circuit. The exemplary functions, such as the function 1086, include one or more software routines, modules and/or data sets. The memory unit 1082 can be tied to another memory circuit (not shown) which either can be of the volatile or nonvolatile type. As an alternative, the memory unit 1082 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "couple" and any variations thereof may indicate a direct or indirect connection between elements. For example, a first element coupled to a second element may be directly connected to the second element, or indirectly connected to the second element through another element.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. An apparatus operable in a communication system, comprising:
   means for determining, at a wireless communication device, a set of wireless communication device functionalities based on a network identifier, wherein the set of wireless communication device functionalities comprises customizations for a network carrier that corresponds to the network identifier, and wherein the customizations specify behavior following a network failure; and
   means for enabling, at the wireless communication device, the set of wireless communication device functionalities.

2. The apparatus of claim 1, wherein the network identifier is included in a network identifier table.

3. The apparatus of claim 1, wherein the set of wireless communication device functionalities is determined using a functionality table that maps one or more wireless communication device functionalities to one or more networks based on the network identifier.

4. The apparatus of claim 1, wherein the set of wireless communication device functionalities is determined using a functionality table that comprises a services and customizations list table.

5. The apparatus of claim 1, further comprising means for disabling remaining wireless communication device functionalities.

6. The apparatus of claim 1, further comprising means for determining whether a network is a home network or a roaming network.

7. The apparatus of claim 6, wherein the set of wireless communication device functionalities are based on one or more roaming agreements if the network is a roaming network.

8. The apparatus of claim 1, further comprising means for updating one or more of a functionality table and a network identifier table over the air.

9. The apparatus of claim 8, wherein updating one or more of the functionality table and the network identifier table over the air is based on received input.

10. The apparatus of claim 8, wherein updating one or more of the functionality table and the network identifier table over the air comprises updating one or more of behaviors, customizations, services, features, functions, applications and network identifiers.

11. The apparatus of claim 1, wherein the set of wireless communication device functionalities comprise at least one of a group consisting of behaviors, customizations, services, features, functions and applications.

12. The apparatus of claim 1, further comprising:
   means for detecting a network; and
   means for comparing the network with a network identifier table.

13. The apparatus of claim 1, further comprising means for storing one or more of a functionality table and a network identifier table on the apparatus.

14. The apparatus of claim 1, wherein the wireless communication device functionalities are internet protocol multimedia subsystem functionalities.

15. An apparatus, comprising:
   circuitry configured to determine, at a wireless communication device, a set of wireless communication device functionalities based on a network identifier, and to enable, at the wireless communication device, the set of wireless communication device functionalities, wherein the set of wireless communication device functionalities comprises customizations for a network carrier that corresponds to the network identifier, and wherein the customizations specify behavior following a network failure.

16. The apparatus of claim 15, wherein the network identifier is included in a network identifier table.

17. The apparatus of claim 15, wherein the set of wireless communication device functionalities is determined using a functionality table that maps one or more wireless communication device functionalities to one or more networks based on the network identifier.

18. The apparatus of claim 15, wherein the set of wireless communication device functionalities is determined using a functionality table that comprises a services and customizations list table.

19. The apparatus of claim 15, further comprising circuitry configured to disable remaining wireless communication device functionalities.

20. The apparatus of claim 15, further comprising circuitry configured to determine whether a network is a home network or a roaming network.

21. The apparatus of claim 20, wherein the set of wireless communication device functionalities are based on one or more roaming agreements if the network is a roaming network.

22. The apparatus of claim 15, further comprising circuitry configured to update one or more of a functionality table and a network identifier table over the air.

23. The apparatus of claim 22, wherein updating one or more of the functionality table and the network identifier table over the air is based on received input.

24. The apparatus of claim 22, wherein updating one or more of the functionality table and the network identifier table over the air comprises updating one or more of behaviors, customizations, services, features, functions, applications and network identifiers.

25. The apparatus of claim 15, wherein the set of wireless communication device functionalities comprise at least one of a group consisting of behaviors, customizations, services, features, functions and applications.

26. The apparatus of claim 15, further comprising:
   circuitry configured to detect a network, and to compare the network with a network identifier table.

27. The apparatus of claim 15, further comprising circuitry configured to store one or more of a functionality table and a network identifier table on the apparatus.

28. The apparatus of claim 15, wherein the wireless communication device functionalities are internet protocol multimedia subsystem functionalities.

29. A method operable by an apparatus, comprising:
determining, at a wireless communication device, a set of wireless communication device functionalities based on a network identifier, wherein the set of wireless communication device functionalities comprises customizations for a network carrier that corresponds to the network identifier, and wherein the customizations specify behavior following a network failure; and
enabling, at the wireless communication device, the set of wireless communication device functionalities.

30. The method of claim 29, wherein the network identifier is included in a network identifier table.

31. The method of claim 29, wherein the set of wireless communication device functionalities is determined using a functionality table that maps one or more wireless communication device functionalities to one or more networks based on the network identifier.

32. The method of claim 29, wherein the set of wireless communication device functionalities is determined using a functionality table that comprises a services and customizations list table.

33. The method of claim 29, further comprising disabling remaining wireless communication device functionalities.

34. The method of claim 29, further comprising determining whether a network is a home network or a roaming network.

35. The method of claim 34, wherein the set of wireless communication device functionalities are based on one or more roaming agreements if the network is a roaming network.

36. The method of claim 29, further comprising updating one or more of a functionality table and a network identifier table over the air.

37. The method of claim 36, wherein updating one or more of the functionality table and the network identifier table over the air is based on received input.

38. The method of claim 36, wherein updating one or more of the functionality table and the network identifier table over the air comprises updating one or more behaviors, customizations, services, features, functions, applications and network identifiers.

39. The method of claim 29, wherein the set of wireless communication device functionalities comprise at least one of a group consisting of behaviors, customizations, services, features, functions and applications.

40. The method of claim 29, further comprising:
detecting a network; and
comparing the network with a network identifier table.

41. The method of claim 29, further comprising storing one or more of a functionality table and a network identifier table on the apparatus.

42. The method of claim 29, wherein the wireless communication device functionalities are internet protocol multimedia subsystem functionalities.

43. A non-transitory tangible computer-readable medium having instructions thereon, the instructions comprising:
code for causing an apparatus to determine, at a wireless communication device, a set of wireless communication device functionalities based on a network identifier, wherein the set of wireless communication device functionalities comprises customizations for a network carrier that corresponds to the network identifier, wherein the customizations specify behavior following a network failure; and
code for causing the apparatus to enable, at the wireless communication device, the set of wireless communication device functionalities.

44. The non-transitory tangible computer-readable medium of claim 43, wherein the set of wireless communication device functionalities is determined using a functionality table that maps one or more wireless communication device functionalities to one or more networks based on the network identifier.

45. The non-transitory tangible computer-readable medium of claim 43, the instructions further comprising code for causing the apparatus to disable remaining wireless communication device functionalities.

46. The non-transitory tangible computer-readable medium of claim 43, the instructions further comprising code for causing the apparatus to determine whether a network is a home network or a roaming network.

47. The non-transitory tangible computer-readable medium of claim 43 the instructions further comprising code for causing the apparatus to update one or more of a functionality table and a network identifier table over the air.

48. The non-transitory tangible computer-readable medium of claim 43, wherein the set of wireless communication device functionalities comprise at least one of a group consisting of behaviors, customizations, services, features, functions and applications.

49. The non-transitory tangible computer-readable medium of claim 43, the instructions further comprising:
code for causing the apparatus to detect a network; and
code for causing the apparatus to compare the network with a network identifier table.

50. The non-transitory tangible computer-readable medium of claim 43, wherein the wireless communication device functionalities are internet protocol multimedia subsystem functionalities.

* * * * *